US012103324B2

(12) United States Patent
Uchiyama

(10) Patent No.: US 12,103,324 B2
(45) Date of Patent: Oct. 1, 2024

(54) INK RIBBON CASSETTE AND PRINTING APPARATUS

(71) Applicant: NIDEC INSTRUMENTS CORPORATION, Nagano (JP)

(72) Inventor: Ryo Uchiyama, Nagano (JP)

(73) Assignee: NIDEC INSTRUMENTS CORPORATION, Nagano (JP)

( * ) Notice: Subject to any disclaimer, the term of this patent is extended or adjusted under 35 U.S.C. 154(b) by 0 days.

(21) Appl. No.: 18/331,927

(22) Filed: Jun. 8, 2023

(65) Prior Publication Data

US 2023/0406018 A1 Dec. 21, 2023

(30) Foreign Application Priority Data

Jun. 20, 2022 (JP) ................................ 2022-098531

(51) Int. Cl.

| | |
|---|---|
| ***B41J 32/00*** | (2006.01) |
| ***B41J 2/325*** | (2006.01) |
| ***B41J 33/00*** | (2006.01) |
| ***B41J 35/36*** | (2006.01) |
| *B41J 15/04* | (2006.01) |

(52) U.S. Cl.

CPC ............... *B41J 32/00* (2013.01); *B41J 2/325* (2013.01); *B41J 33/003* (2013.01); *B41J 35/36* (2013.01); *B41J 15/044* (2013.01)

(58) Field of Classification Search

CPC ........ B41J 15/044; B41J 35/36; B41J 33/003; B41J 2/325; B41J 32/00

See application file for complete search history.

(56) References Cited

U.S. PATENT DOCUMENTS

| | | | | |
|---|---|---|---|---|
| 5,544,965 | A * | 8/1996 | Kamoda | B41J 11/42 400/582 |
| 2017/0066269 | A1* | 3/2017 | Ehara | B41J 17/32 |
| 2017/0106678 | A1* | 4/2017 | Sakano | B41J 15/044 |
| 2018/0250966 | A1* | 9/2018 | Tsugaru | B41J 2/325 |
| 2019/0118552 | A1* | 4/2019 | Shinoda | B41J 2/325 |
| 2022/0242153 | A1* | 8/2022 | Tagami | B41J 2/1752 |

FOREIGN PATENT DOCUMENTS

| | | |
|---|---|---|
| JP | 2014104743 | 6/2014 |

* cited by examiner

*Primary Examiner* — David H Banh

(74) *Attorney, Agent, or Firm* — JCIPRNET

(57) ABSTRACT

In an ink ribbon cassette, a case housing an ink ribbon wound around a supply-side bobbin and the ink ribbon wound around a wind-up side bobbin includes a case main body including a cylindrical supply-side case portion to house the ink ribbon wound around the supply-side bobbin and a cylindrical wind-up side case portion to house the ink ribbon wound around the wind-up side bobbin and a cover to close one end of the cylindrically formed supply-side case portion and one end of the cylindrically formed wind-up side case portion. The cover is removably attached to the case main body.

12 Claims, 8 Drawing Sheets

INK RIBBON CASSETTE AND PRINTING APPARATUS

CROSS REFERENCE TO RELATED APPLICATION

The present invention claims priority under 35 U.S.C. § 119 to Japanese Application No. 2022-098531 filed Jun. 20, 2022, the entire content of which is incorporated herein by reference.

BACKGROUND

Field of the Invention

At least an embodiment of the present invention relates to an ink ribbon cassette housing an ink ribbon. At least an embodiment of the present invention further relates to a printing apparatus including the ink ribbon cassette.

Description of the Related Documents

There are conventionally known printing apparatuses that transfer ink on a heated ink ribbon to a card conveyed in a card conveyance path to execute printing (see, for example, JP-A2014-104743). The printing apparatus described in JP-A2014-104743 includes an ink ribbon cartridge and a main body portion to which the ink ribbon cartridge is removably attached. The ink ribbon cartridge includes an ink ribbon cassette and a cartridge main body portion to which the ink ribbon cassette is removably attached.

In the printing apparatus described in JP-A2014-104743, the ink ribbon cassette includes a supply roll around which the ink ribbon is wound, a wind-up roll around which the ink ribbon supplied from the supply roll is wound, and a case body housing the supply roll and the wind-up roll. The case body includes a case main body and a cover member fixed to the case main body. In the printing apparatus described in JP-A2014-104743, to replace the used ink ribbon, the ink ribbon is replaced as the entire ink ribbon cassette.

Lower running cost for printing apparatuses is preferable for printing apparatuses using ink ribbons as consumables, such as the printing apparatus described in JP-A2014-104743. Therefore, the issue for at least an embodiment of the present invention is to provide an ink ribbon cassette that may reduce the running cost of the printing apparatus using the ink ribbon. Furthermore, the issue for at least an embodiment of the present invention is to provide a printing apparatus including the ink ribbon cassette.

SUMMARY

An ink ribbon cassette according to an aspect of at least an embodiment of the present invention includes: an ink ribbon unit including an ink ribbon, a supply-side bobbin around which the ink ribbon before ink transfer is wound, and a wind-up side bobbin around which the ink ribbon after ink transfer is wound; and a case to house the ink ribbon wound around the supply-side bobbin and the ink ribbon wound around the wind-up side bobbin, and the case includes: a case main body including a cylindrical supply-side case portion to house the ink ribbon wound around the supply-side bobbin and a cylindrical wind-up side case portion to house the ink ribbon wound around the wind-up side bobbin; and a cover removably attached to the case main body to close one end of the cylindrically formed supply-side case portion and one end of the cylindrically formed wind-up side case portion, the case main body is provided with a case-side engagement portion to fix the cover to the case main body, the cover includes: a lock member provided with a cover-side engagement portion to engage with the case-side engagement portion; a cover main body to movably hold the lock member; and a bias member to bias the lock member to the cover main body, the lock member is movable with respect to the cover main body between a lock position where the case-side engagement portion engages with the cover-side engagement portion so that the cover is fixed to the case main body and an unlock position where an engagement state between the case-side engagement portion and the cover-side engagement portion is canceled so that the cover is removable from the case main body, and the bias member biases the lock member toward the lock position.

In the ink ribbon cassette according to the present aspect, a case housing an ink ribbon wound around a supply-side bobbin and the ink ribbon wound around a wind-up side bobbin includes a case main body including a cylindrical supply-side case portion to house the ink ribbon wound around the supply-side bobbin and a cylindrical wind-up side case portion to house the ink ribbon wound around the wind-up side bobbin and a cover to close one end of the cylindrically formed supply-side case portion and one end of the cylindrically formed wind-up side case portion, and the cover is removably attached to the case main body.

Therefore, according to the present aspect, to replace the used ink ribbon, the cover may be removed from the case main body and only the ink ribbon unit may be replaced. That is, according to the present aspect, when the used ink ribbon is replaced, only the ink ribbon unit may be replaced and the case may be reused. Thus, the ink ribbon cassette according to the present aspect may reduce the running cost of the printing apparatus using the ink ribbon.

Furthermore, according to the present aspect, the cover includes a lock member provided with a cover-side engagement portion to engage with the case-side engagement portion of the case main body, a cover main body to movably hold the lock member, and a bias member to bias the lock member to the cover main body. Further, according to the present aspect, the lock member is movable with respect to the cover main body between a lock position where the case-side engagement portion engages with the cover-side engagement portion so that the cover is fixed to the case main body and an unlock position where an engagement state between the case-side engagement portion and the cover-side engagement portion is canceled so that the cover is removable from the case main body, and the bias member biases the lock member toward the lock position.

Therefore, according to the present aspect, for example, the operator may move the lock member to the unlock position against the force of the bias member to remove the cover from the case main body. Thus, according to the present aspect, the cover may be easily removed from the case main body even at the site where the printing apparatus is installed, and as a result, only the ink ribbon unit may be easily replaced.

According to the present aspect, for example, an axial direction of the cylindrically formed supply-side case portion is parallel to an axial direction of the cylindrically formed wind-up side case portion, when a predetermined direction perpendicular to the axial direction of the supply-side case portion is a front-back direction, the supply-side case portion and the wind-up side case portion are located with a space in the front-back direction, and the cover includes, as the lock member, a first lock member slidable with respect to the cover main body in the front-back direction and a second lock member that is located behind the first lock member and is slidable with respect to the cover main body in the front-back direction and includes, as the bias member, a first bias member to bias the first lock member toward a front side and a second bias member to bias the second lock member toward a back side.

According to the present aspect, for example, when the axial direction of the supply-side case portion is the right-left direction, the cover is attached to the left end portion of the case main body, the cover main body includes a first cover main body and a second cover main body to sandwich the lock member in the right-left direction, the first cover main body is located on the left side of the second cover main body, the lock member is provided with a finger hook portion to slide the lock member inward in the front-back direction, and the first cover main body is provided with an opening to expose the finger hook portion on the left surface of the cover. In this case, the use of the finger hook portion exposed on the left surface of the cover makes it possible to easily slide the lock member to the unlock position.

According to the present aspect, the ink ribbon cassette may include the wireless tag attached to the case to store information about the ink ribbon. This configuration makes it possible to cause the printing apparatus to determine, based on the information stored in the wireless tag, whether the ink ribbon cassette has the appropriate ink ribbon that conforms to the specifications, or the like, of the printing apparatus.

According to the present aspect, for example, the wireless tag is formed like a seal and is attached to a flat-plate like reinforcement plate or is formed like a flat plate.

According to the present aspect, at least one of the case main body and the cover may be provided with a recessed portion to which the wireless tag is attached, and when the wireless tag is formed like a seal and is attached to the reinforcement plate, the reinforcement plate having the wireless tag attached thereto is inserted into and attached to the recessed portion, and when the wireless tag is formed like a flat plate, the flat-plate like wireless tag is inserted into and attached to the recessed portion.

This configuration allows the wireless tag to be easily attached to and removed from the case. Therefore, even when only the ink ribbon unit is replaced and the case is reused at the time of replacement of the used ink ribbon, or even when the ink ribbon unit to be replaced includes an ink ribbon unit including a different type of ink ribbon, the wireless tag attached to the case may be easily replaced with a wireless tag corresponding to the ink ribbon to be replaced at the time of replacement of the ink ribbon.

The ink ribbon cassette according to the present aspect may be used for the printing apparatus including the ink ribbon cassette and the main body portion to which the ink ribbon cassette is removably attached. In the printing apparatus, for example, the main body portion includes a medium conveyance path through which a print medium is conveyed and a thermal head to heat an ink ribbon and transfer ink on the ink ribbon to the print medium passing through the medium conveyance path and execute printing. The printing apparatus may reduce the running cost of the printing apparatus.

The ink ribbon cassette according to the present aspect may be used for the printing apparatus including the ink ribbon cassette and the main body portion to which the ink ribbon cassette is removably attached. The printing apparatus may include a wireless communication part to perform short-range wireless communications with the wireless tag and a controller to control the printing apparatus, and the main body portion includes a medium conveyance path through which the print medium is conveyed and a thermal head to heat the ink ribbon and transfer ink on the ink ribbon to the print medium passing through the medium conveyance path and execute printing, and when information about the ink ribbon read by the wireless communication part is predetermined information, the controller causes the printing apparatus to perform a printing process.

The printing apparatus may reduce the running cost of the printing apparatus. Furthermore, based on the information about the ink ribbon read by the wireless communication part (i.e., the information about the ink ribbon stored in the wireless tag), the printing apparatus may perform a printing process only when the ink ribbon cassette includes the appropriate ink ribbon that confirms to the specifications, or the like, of the printing apparatus.

As described above, according to the present aspect, it is possible to reduce the running cost of the printing apparatus using the ink ribbon.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

An embodiment of the present invention will be described below with reference to the drawings.

Schematic Configuration of Printing Apparatus

Figure 1:
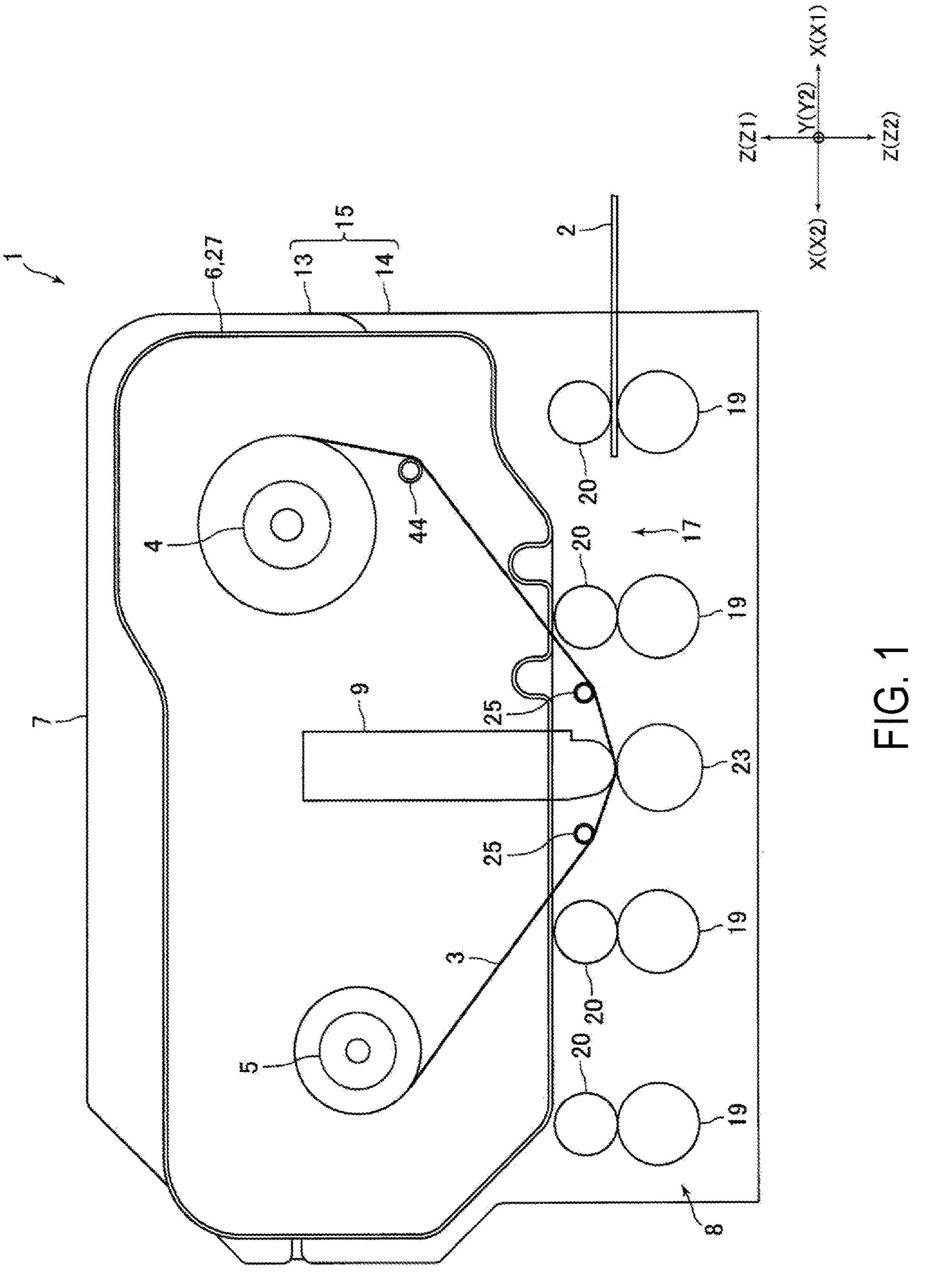
FIG. 1 is a schematic side view illustrating a configuration of a printing apparatus according to an embodiment of the present invention.
Figure 2:
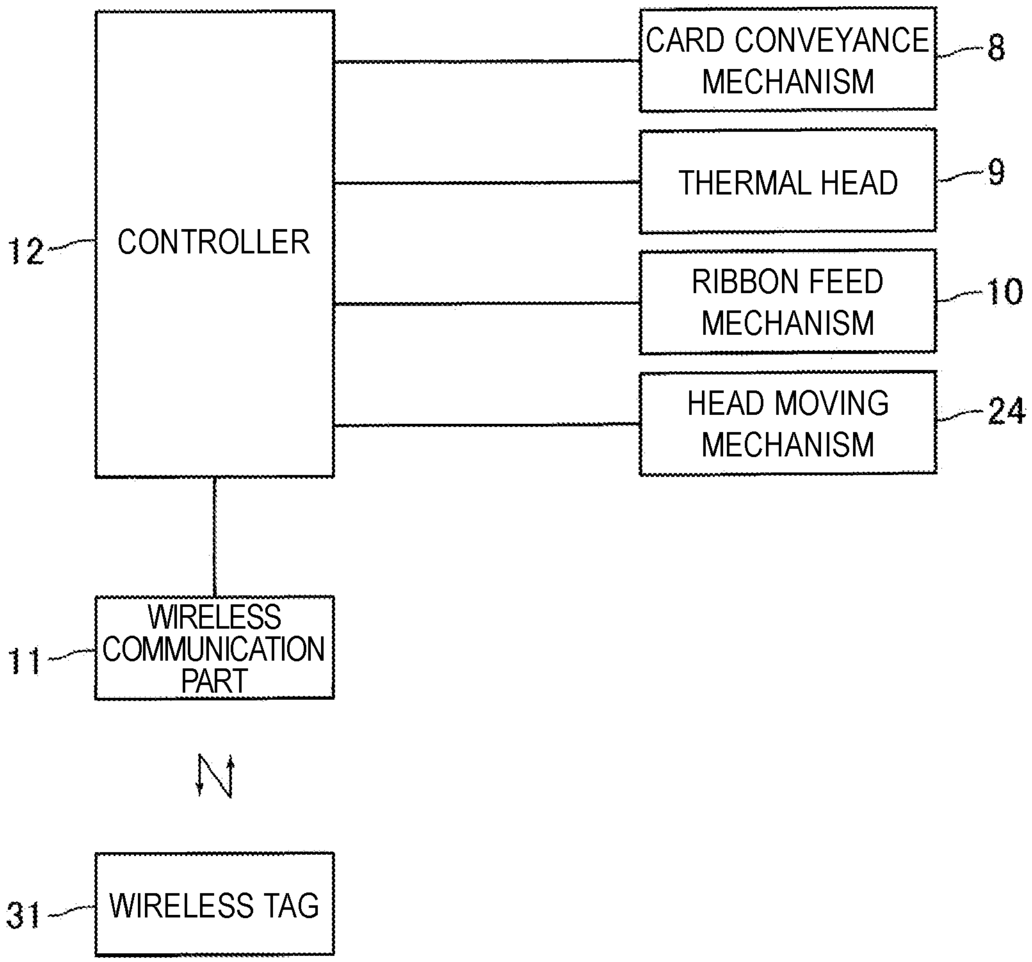
FIG. 2 is a block diagram illustrating a configuration of the printing apparatus illustrated in FIG. 1.
Figure 3:
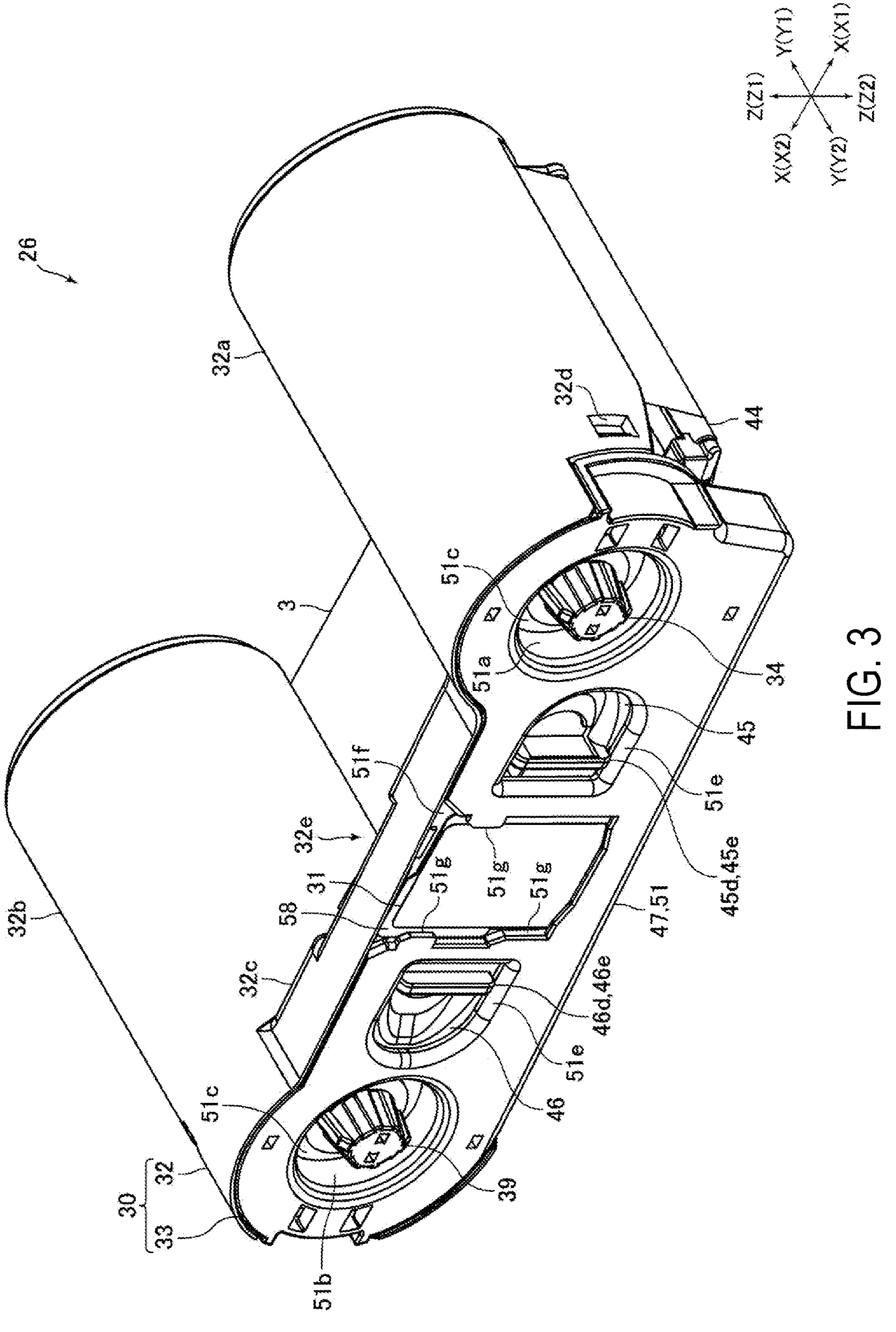
FIG. 3 is a perspective view of an ink ribbon cassette according to an embodiment of the present invention.

FIG. 1 is a schematic side view illustrating a configuration of a printing apparatus 1 according to an embodiment of the present invention. FIG. 2 is a block diagram illustrating a configuration of the printing apparatus 1 illustrated in FIG. 1. FIG. 3 is a perspective view of an ink ribbon cassette 26 according to an embodiment of the present invention.

The printing apparatus 1 according to the present embodiment is an apparatus to print images such as characters, symbols, and figures on a card 2, which is a print medium. Specifically, the printing apparatus 1 is a thermal-transfer printing apparatus that uses an ink ribbon 3, which is formed by applying ink to a belt-like film, heats the ink on the ink ribbon 3 to transfer the ink on the ink ribbon 3 to the card 2, and executes printing. For example, the printing apparatus 1 is mounted on a high-level apparatus such as a card issuing apparatus while in use.

The printing apparatus 1 includes an ink ribbon cartridge 6 (hereinafter referred to as "cartridge 6") including a supply-side bobbin 4 and a wind-up side bobbin 5, around which the ink ribbon 3 is wound, and a main body portion 7 to which the cartridge 6 is removably attached. The main body portion 7 includes a card conveyance mechanism 8 to convey the card 2, a thermal head 9 to heat the ink ribbon 3 and transfer the ink on the ink ribbon 3 to the card 2 to execute printing, and a ribbon feed mechanism 10 to feed the ink ribbon 3 between the supply-side bobbin 4 and the wind-up side bobbin 5. Furthermore, the printing apparatus 1 includes a wireless communication part 11 to perform short-range wireless communications with a wireless tag 31 described below and a controller 12 to control the printing apparatus 1. The wireless communication part 11 is electrically connected to the controller 12.

The card 2 is, for example, a vinyl chloride card having a thickness of approximately 0.7 mm to 0.8 mm. The card 2 is formed to be rectangular. A surface of the card 2 is provided with, for example, a magnetic stripe on which magnetic data is recorded. Furthermore, an IC chip or a communication antenna may be built into the card 2. Further, the card 2 may be a PET (polyethylene terephthalate) card having a thickness of approximately 0.18 mm to 0.36 mm, a paper card having a predetermined thickness, etc.

In the following description, the three directions perpendicular to each other are referred to as the X-direction, Y-direction, and Z-direction, respectively. The printing apparatus 1 is installed such that its up-down direction (vertical direction) corresponds to the Z-direction. Therefore, in the following description, the Z-direction is the "up-down direction". Further, the X-direction is the "front-back direction", and the Y-direction is the "right-left direction". Furthermore, one side in the front-back direction, i.e., the side in the X1-direction of FIG. 1, and the like, is the "front" side, the opposite side, i.e., the side in the X2-direction of FIG. 1, and the like, is the "back (rear)" side, one side in the right-left direction, i.e., the side in the Y1-direction of FIG. 3, and the like, is the "right" side, the opposite side, i.e., the side in the Y2-direction of FIG. 3, and the like, is the "left" side, one side in the up-down direction, i.e., the side in the Z1-direction of FIG. 1, and the like, is the "up" side, and the opposite side, i.e., the side in the Z2-direction of FIG. 1, and the like, is the "down" side.

The main body portion 7 includes a chassis 15 including a first chassis 13 located on an upper side and a second chassis 14 located on a lower side. A rotation center shaft is attached to a front upper end side of the second chassis 14. The axial direction of the rotation center shaft corresponds to the right-left direction. A front end side of the first chassis 13 is held in a rotatable manner around the rotation center shaft, and the first chassis 13 is rotatable with respect to the second chassis 14 around the rotation center shaft. When the first chassis 13 is rotated from the state illustrated in FIG. 1 in the clockwise direction in FIG. 1 around the rotation center shaft, the cartridge 6 may be removed upwardly from the chassis 15.

A card conveyance path 17 is formed inside the main body portion 7 as a medium conveyance path through which the card 2 is conveyed. In the card conveyance path 17, the card 2 is conveyed in the front-back direction. The thickness direction of the card 2 during conveyance substantially corresponds to the vertical direction. Furthermore, the longitudinal direction of the card 2, which is formed to be rectangular, during conveyance substantially corresponds to the front-back direction.

The card conveyance mechanism 8 includes a plurality of card conveyance rollers 19 to convey the card 2 in contact with the card 2 and pad rollers 20 located opposite to the card conveyance rollers 19. The card conveyance roller 19 is located so as to face the card conveyance path 17 from below. The plurality of card conveyance rollers 19 is coupled to a card conveyance motor via a power transmission mechanism including a pulley and a timing belt. The card conveyance mechanism 8 is electrically connected to the controller 12. Specifically, the card conveyance motor, and the like, are electrically connected to the controller 12.

The thermal head 9 is located in substantially the center of the printing apparatus 1 in the front-back direction and above the card conveyance path 17. A platen roller 23 is located below the thermal head 9. The platen roller 23 is coupled to the card conveyance motor via the power transmission mechanism and rotates together with the card conveyance roller 19. The thermal head 9 is electrically connected to the controller 12.

The thermal head 9 is coupled to a head moving mechanism 24 to move the thermal head 9 in a direction closer to and away from the card 2 passing through the card conveyance path 17. The head moving mechanism 24 includes a head moving motor, a power transmission mechanism to transmit the power of the motor to the thermal head 9, etc. The head moving mechanism 24 is electrically connected to the controller 12. Specifically, the head moving motor, and the like, are electrically connected to the controller 12.

The card 2 and the ink ribbon 3 pass between the thermal head 9 and the platen roller 23 in the up-down direction. Furthermore, the thermal head 9 moves up and down with respect to the platen roller 23 due to the power transmitted from the head moving mechanism 24. The thermal head 9 is in contact with the upper surface of the card 2 via the ink ribbon 3 with a predetermined contact force to print on the upper surface of the card 2 passing through the card conveyance path 17. On both sides of the thermal head 9 in the front-back direction, or the like, guide shafts 25 are installed to guide the ink ribbon 3 in the printing apparatus 1.

The cartridge 6 includes the ink ribbon cassette 26 (see FIG. 3) including the supply-side bobbin 4 and the wind-up side bobbin 5 described above, and a cartridge main body portion 27 to which the ink ribbon cassette 26 is removably attached. As described above, the cartridge 6 is removably attached to the main body portion 7. Specifically, the ink ribbon cassette 26 is removably attached to the main body portion 7. The cartridge 6 is located above the card conveyance path 17 and is attachable to and removable from the chassis 15 from above. The cartridge main body portion 27 includes a power transmission mechanism, or the like, to transmit the power of the ribbon feed mechanism 10 to the supply-side bobbin 4 and the wind-up side bobbin 5.

The supply-side bobbin 4 and the wind-up side bobbin 5 are formed to be cylindrical. The supply-side bobbin 4 is arranged such that the axial direction of the supply-side bobbin 4 corresponds to the right-left direction, and the wind-up side bobbin 5 is arranged such that the axial direction of the wind-up side bobbin 5 corresponds to the right-left direction. The supply-side bobbin 4 is located in front of the thermal head 9, and the wind-up side bobbin 5 is located behind the thermal head 9. The supply-side bobbin 4 has the wound ink ribbon 3 (i.e., the ink ribbon 3 before ink transfer) that is fed toward the thermal head 9. The wind-up side bobbin 5 has the wound ink ribbon 3 with which the ink has been transferred to the card 2 by the thermal head 9.

According to the present embodiment, the ink ribbon cassette 26 may be attached to and removed from the cartridge main body portion 27 from the left side of the cartridge main body portion 27. Specifically, to remove the ink ribbon cassette 26 from the cartridge main body portion 27, the ink ribbon cassette 26 is pulled out to the left side, and to attach the ink ribbon cassette 26 to the cartridge main body portion 27, the ink ribbon cassette 26 located on the left side of the cartridge main body portion 27 is pushed to the right side. The specific configuration of the ink ribbon cassette 26 will be described below.

The ribbon feed mechanism 10 includes a ribbon feed roller to feed the ink ribbon 3 in contact with the ink ribbon 3, a pad roller located opposite to the ribbon feed roller, a ribbon feed motor to which the ribbon feed roller is coupled, and a power transmission mechanism to transmit the power of the motor to the ribbon feed roller, or the like. The ribbon feed mechanism 10 is electrically connected to the controller 12. Specifically, the ribbon feed motor, and the like, are electrically connected to the controller 12.

Configuration of Ink Ribbon Cassette

Figure 4:
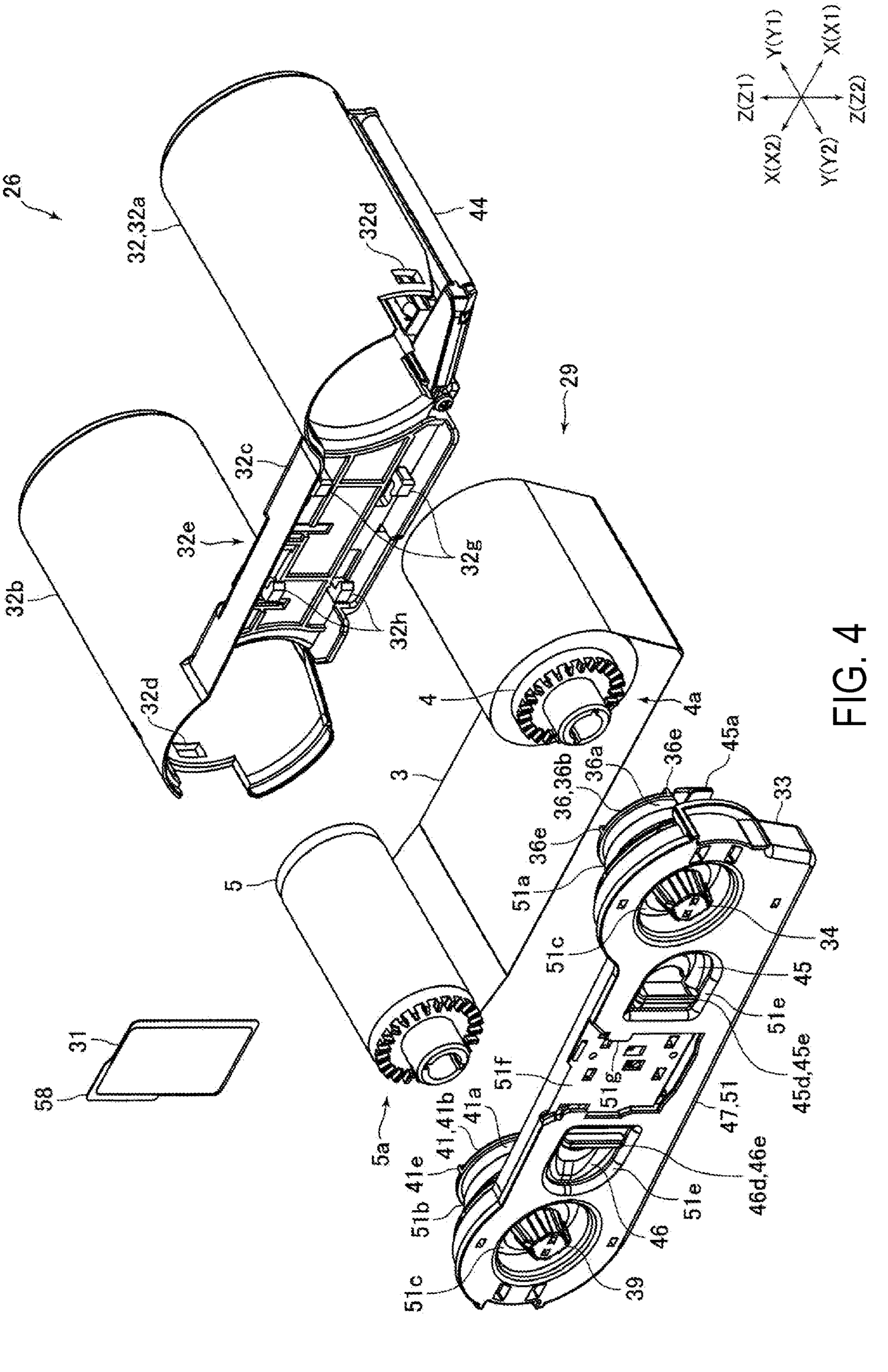
FIG. 4 is an exploded perspective view of the ink ribbon cassette illustrated in FIG. 3.
Figure 5:
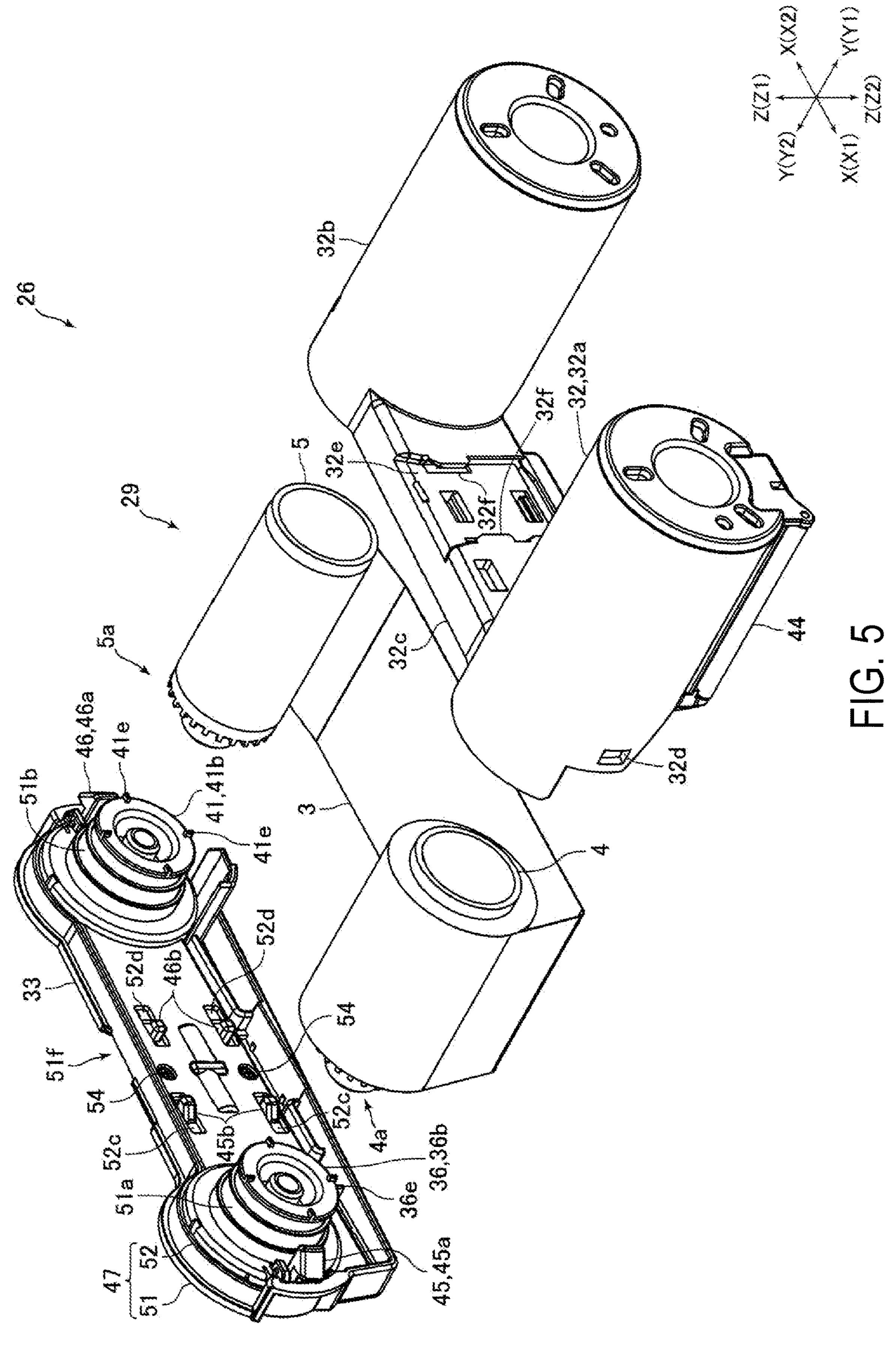
FIG. 5 is an exploded perspective view of the ink ribbon cassette illustrated in FIG. 4 from a different direction.
Figure 6:
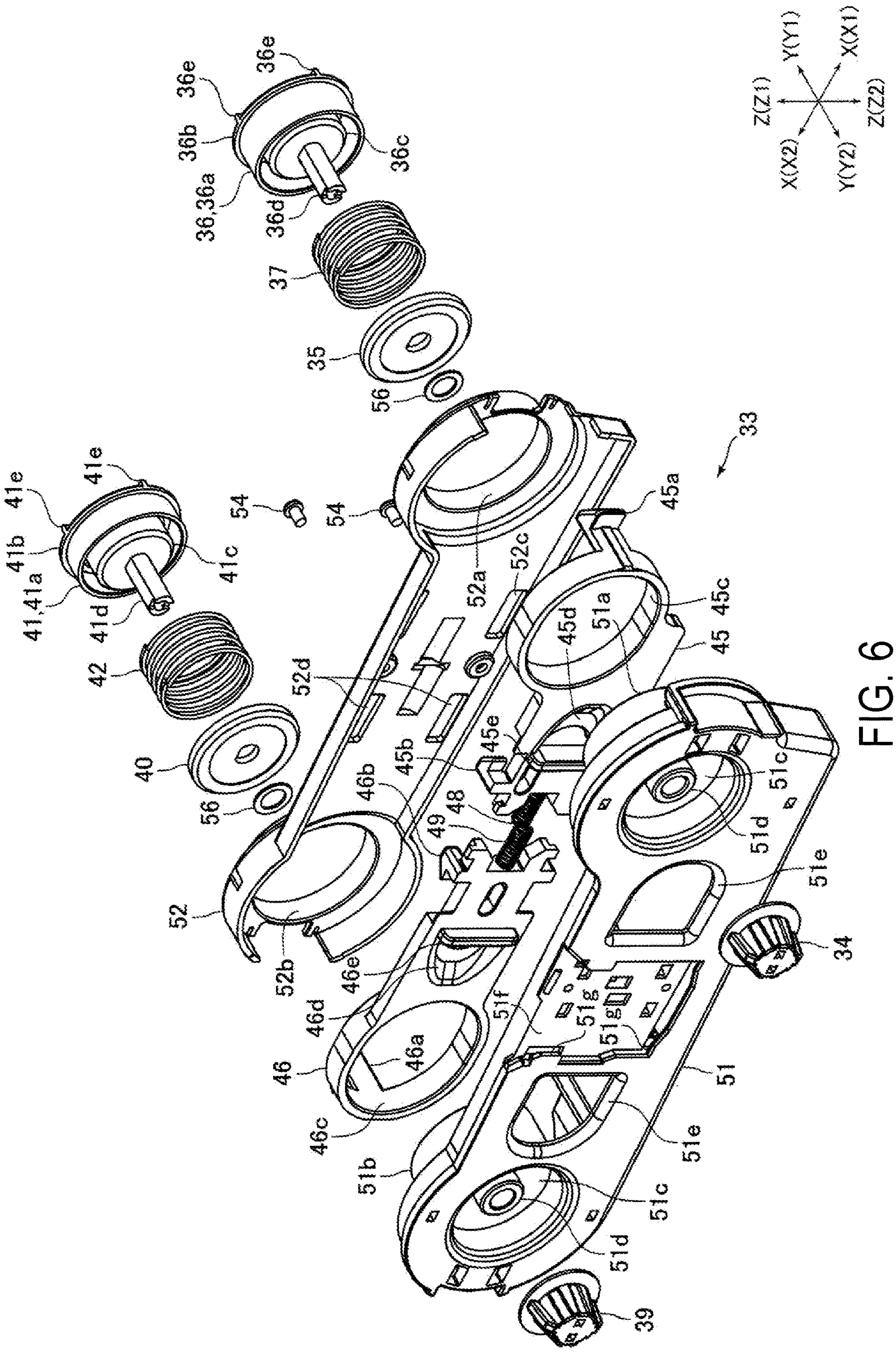
FIG. 6 is an exploded perspective view of a cover, and the like, illustrated in FIG. 4.
Figure 7:
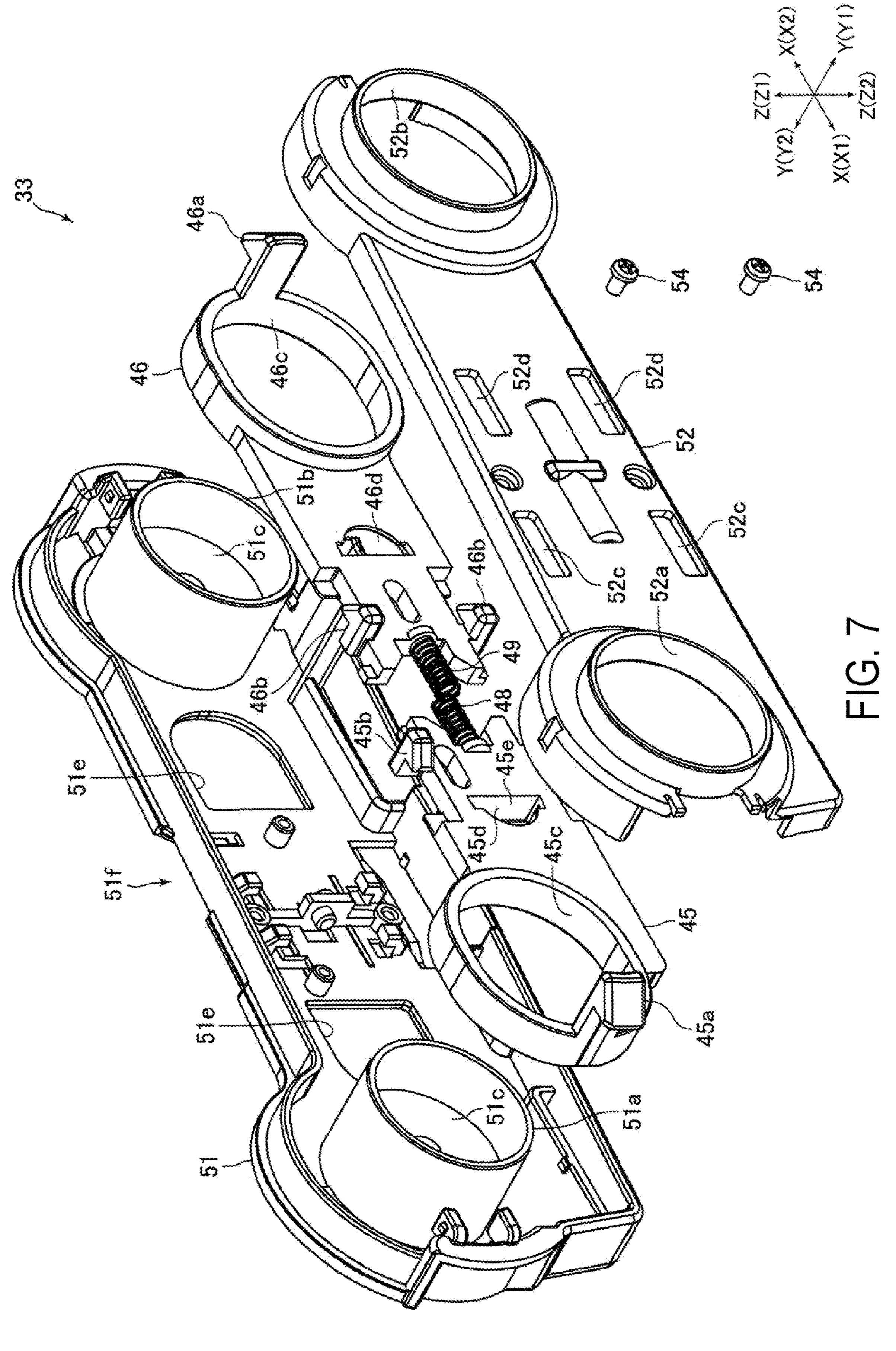
FIG. 7 is an exploded perspective view of the cover illustrated in FIG. 5.

FIG. 4 is an exploded perspective view of the ink ribbon cassette 26 illustrated in FIG. 3. FIG. 5 is an exploded perspective view of the ink ribbon cassette 26 illustrated in FIG. 4 from a different direction. FIG. 6 is an exploded perspective view of a cover 33, and the like, illustrated in FIG. 4. FIG. 7 is an exploded perspective view of the cover 33 illustrated in FIG. 5.

As described above, the ink ribbon cassette 26 includes the supply-side bobbin 4 and the wind-up side bobbin 5 around which the ink ribbon 3 is wound. According to the present embodiment, the ink ribbon 3, the supply-side bobbin 4, and the wind-up side bobbin 5 constitute the ink ribbon unit 29. In addition to the ink ribbon unit 29, the ink ribbon cassette 26 includes a case 30 to house the ink ribbon 3 wound around the supply-side bobbin 4 and the ink ribbon 3 wound around the wind-up side bobbin 5, and a wireless tag 31 attached to the case 30.

The case 30 includes a case main body 32 and the cover 33 that is removably attached to the case main body 32. The case 30 according to the present embodiment includes the case main body 32 and the cover 33. Furthermore, the ink ribbon cassette 26 includes a knob 34, a sleeve 35, a coupling 36, and a compression coil spring 37 to manually rotate the supply-side bobbin 4 and a knob 39, a sleeve 40, a coupling 41, and a compression coil spring 42 to manually rotate the wind-up side bobbin 5.

The case main body 32 includes a cylindrical supply-side case portion 32*a* to house the ink ribbon 3 wound around the supply-side bobbin 4, a cylindrical wind-up side case portion 32*b* to house the ink ribbon 3 wound around the wind-up side bobbin 5, and a coupling portion 32*c* to couple the supply-side case portion 32*a* and the wind-up side case portion 32*b*. The supply-side case portion 32*a* and the wind-up side case portion 32*b* are formed to be cylindrical. The supply-side case portion 32*a* is arranged such that the axial direction of the supply-side case portion 32*a* corresponds to the right-left direction, and the wind-up side case portion 32*b* is arranged such that the axial direction of the wind-up side case portion 32*b* corresponds to the right-left direction.

Furthermore, the supply-side case portion 32*a* is located in front of the wind-up side case portion 32*b*, and the supply-side case portion 32*a* and the wind-up side case portion 32*b* are located with a space in the front-back direction. Thus, the axial direction of the cylindrically formed supply-side case portion 32*a* is parallel to the axial direction of the cylindrically formed wind-up side case portion 32*b*. The right-left direction (Y-direction) according to the present embodiment is the axial direction of the supply-side case portion 32*a* and the wind-up side case portion 32*b*. Furthermore, the front-back direction (X-direction) according to the present embodiment is a predetermined direction perpendicular to the axial direction of the supply-side case portion 32*a*.

The coupling portion 32*c* couples a left end of the supply-side case portion 32*a* to a left end of the wind-up side case portion 32*b*. The coupling portion 32*c* is located between the supply-side case portion 32*a* and the wind-up side case portion 32*b* in the front-back direction. The ink ribbon 3 is exposed outside the case main body 32 between the supply-side case portion 32*a* and the wind-up side case portion 32*b* in the front-back direction and on the right side of the coupling portion 32*c*.

The case main body 32 is provided with engagement holes 32*d* and engagement protrusions 32*g* and 32*h* to fix the cover 33 to the case main body 32 (see FIG. 4). The engagement holes 32*d* and the engagement protrusions 32*g* and 32*h* according to the present embodiment are case-side engagement portions. The engagement holes 32*d* are formed at two positions: a left front end portion of the supply-side case portion 32*a* and a left rear end portion of the wind-up side case portion 32*b*. One of the engagement holes 32*d* is a square hole penetrating through the supply-side case portion 32*a* in the front-back direction, and the other engagement hole 32*d* is a square hole penetrating through the wind-up side case portion 32*b* in the front-back direction.

The engagement protrusion 32*g* is formed on the coupling portion 32*c*. Specifically, the engagement protrusion 32*g* is formed on the front side with respect to the center of the coupling portion 32*c* in the front-back direction. Furthermore, the engagement protrusions 32*g* are formed at two positions with a space in the up-down direction. The engagement protrusion 32*g* extends toward the left side. The engagement protrusion 32*g* is formed in a hook shape, and a projecting portion that projects toward the back is formed at an end portion (left end portion) of the engagement protrusion 32*g*.

The engagement protrusion 32*h* is formed on the coupling portion 32*c*. Specifically, the engagement protrusion 32*h* is formed on the back side with respect to the center of the coupling portion 32*c* in the front-back direction. Furthermore, the engagement protrusions 32*h* are formed at two positions with a space in the up-down direction. The engagement protrusion 32*h* extends toward the left side. The engagement protrusion 32*h* is formed in a hook shape, and a projecting portion that projects toward the front is formed at an end portion (left end portion) of the engagement protrusion 32*h*.

The case main body 32 is provided with a recessed portion 32*e* to which the wireless tag 31 is attached. The recessed portion 32*e* is formed on a right surface of the coupling portion 32*c*. The recessed portion 32*e* is formed in a center portion of the coupling portion 32*c* in the front-back direction. The recessed portion 32*e* is rectangularly recessed toward the left side. Further, the recessed portion 32*e* is formed from a lower end portion of the coupling portion 32*c* to an upper end of the coupling portion 32*c*. A protrusion 32*f* is formed on the edge of the recessed portion 32*e* to prevent the wireless tag 31 from being removed out of the recessed portion 32*e* to the right side. The protrusion 32*f* protrudes toward the inner side of the recessed portion 32*e*. According to the present embodiment, the wireless tag 31 is attached to a recessed portion 51*f* described below formed in the cover 33, and is not attached to the recessed portion 32*e*.

A roller 44 to guide the ink ribbon 3 is rotatably attached to a front lower end portion of the supply-side case portion 32*a*. The roller 44 is arranged such that the axial direction of the roller 44 corresponds to the right-left direction. Further, a prism is fixed to a lower end portion of the supply-side case portion 32*a*. A reflective optical sensor attached to the main body portion 7 is provided below the prism. The ink ribbon 3 drawn from the supply-side bobbin 4 is sandwiched between the prism and the optical sensor in the up-down direction. According to the present embodiment, based on the detection result of the optical sensor, it is detected that the cartridge 6 is attached to the main body portion 7.

The cover 33 is attached to the left end portion of the case main body 32. The cover 33 closes the left ends of the supply-side case portion 32*a* and the wind-up side case portion 32*b*. That is, the cover 33 closes the respective ends of the supply-side case portion 32*a* and the wind-up side case portion 32*b* formed in a cylindrical shape. The cover 33 includes lock members 45 and 46 provided with engagement protrusions 45*a* and 46*a* serving as cover-side engagement portions that engage with the engagement holes 32*d* of the case main body 32 and engagement protrusions and 46*b* serving as cover-side engagement portions that engage with the engagement protrusions 32*g* and 32*h* of the case main body 32, a cover main body 47 that movably holds the lock members 45 and 46, and compression coil springs 48 and 49 serving as bias members to bias the lock members 45 and 46 to the cover main body 47.

The cover 33 according to the present embodiment includes the two lock members 45 and 46 that are slidable in the front-back direction with respect to the cover main body 47. The lock member 46 is located behind the lock member 45. Furthermore, the cover 33 includes the two compression coil springs 48 and 49. The compression coil spring 48 biases the lock member 45 toward the front side. The compression coil spring 49 biases the lock member 46 toward the back side. The lock member 45 according to the present embodiment is a first lock member, the lock member 46 is a second lock member, the compression coil spring 48 is a first bias member, and the compression coil spring 49 is a second bias member.

The cover main body 47 includes a first cover main body 51 and a second cover main body 52 to sandwich the lock members 45 and 46 in the right-left direction. The first cover main body 51 is located on the left side of the lock members 45 and 46, and the second cover main body 52 is located on the right side of the lock members 45 and 46. That is, the first cover main body 51 is located on the left side of the second cover main body 52.

A through-hole 45*c* penetrating through the lock member 45 in the right-left direction is formed on the front end side of the lock member 45. The through-hole 45*c* is formed to have an oval shape that is slightly elongated in the front-back direction. The engagement protrusion 45*a* is formed on a front end portion on the edge of the through-hole 45*c*. That is, the engagement protrusion 45*a* is formed on the front end portion of the lock member 45. The engagement protrusion 45*a* extends from the edge of the through-hole 45*c* toward the right side. The engagement protrusion 45*a* is elastically deformable in the front-back direction. The engagement protrusion 45*a* is formed in a hook shape, and a projecting portion that projects toward the front side is formed on an end portion (right end portion) of the engagement protrusion 45*a*.

The engagement protrusions 45*b* are formed on the rear end portion of the lock member 45. Further, the engagement protrusions 45*b* are formed at two positions, the upper end and the lower end of the lock member 45. The engagement protrusion 45*b* extends toward the right side. The engagement protrusion 45*b* is formed in a hook shape, and a projecting portion that projects toward the front side is formed in an end portion (right end portion) of the engagement protrusion 45*b*.

In a state where the cover 33 is attached to the case main body 32, the projecting portion in the end portion of the engagement protrusion 45*a* is located in the engagement hole 32*d* formed in the supply-side case portion 32*a*. The engagement protrusion 45*a* engages with the engagement hole 32*d* in the supply-side case portion 32*a* from the back side. Furthermore, in a state where the cover 33 is attached to the case main body 32, the projecting portion in the end portion of the engagement protrusion 45*b* is located behind the projecting portion in the end portion of the engagement protrusion 32*g*. The engagement protrusion 45*b* engages with the engagement protrusion 32*g* from the back side.

The lock member 45 is provided with a finger hook portion 45*d* to slide the lock member 45 to the back side. The finger hook portion 45*d* is located behind the through-hole 45*c*. The finger hook portion 45*d* includes a through-hole penetrating through the lock member 45 in the right-left direction and a protruding portion 45*e* formed in a rear end portion on the edge of the through-hole. The protruding portion 45*e* protrudes toward the left side. The protruding portion 45*e* is formed like a flat plate having a thickness direction in the front-back direction. The rear end portion of the lock member 45 is provided with a protrusion that is inserted into the front end portion of the compression coil spring 48.

A through-hole 46*c* penetrating through the lock member 46 in the right-left direction is formed on the rear end side of the lock member 46. The through-hole 46*c* is formed to have an oval shape that is slightly elongated in the front-back direction. The engagement protrusion 46*a* is formed in the rear end portion on the edge of the through-hole 46*c*. That is, the engagement protrusion 46*a* is formed in the rear end portion of the lock member 46. The engagement protrusion 46*a* extends from the edge of the through-hole 46*c* toward the right side. The engagement protrusion 46*a* is elastically deformable in the front-back direction. The engagement protrusion 46*a* is formed in a hook shape, and a projecting portion that projects toward the back side is formed in the end portion (right end portion) of the engagement protrusion 46*a*.

The engagement protrusions 46*b* are formed in the front end portion of the lock member 46. Furthermore, the engagement protrusions 46*b* are formed at two positions on the upper end and the lower end of the lock member 46. The engagement protrusion 46*b* extends toward the right side. The engagement protrusion 46*b* is formed in a hook shape, and a projecting portion that projects toward the back side is formed in the end portion (right end portion) of the engagement protrusion 46*b*.

In a state where the cover 33 is attached to the case main body 32, the projecting portion in the end portion of the engagement protrusion 46*a* is located in the engagement hole 32*d* formed in the wind-up side case portion 32*b*. The engagement protrusion 46*a* engages with the engagement hole 32*d* in the wind-up side case portion 32*b* from the front side. Furthermore, in a state where the cover 33 is attached to the case main body 32, the projecting portion in the end portion of the engagement protrusion 46*b* is located behind the projecting portion in the end portion of the engagement protrusion 32*h*. The engagement protrusion 46*b* engages with the engagement protrusion 32*h* from the front side.

The lock member 46 is provided with a finger hook portion 46*d* to slide the lock member 46 to the front side. The finger hook portion 46*d* is located in front of the through-hole 46*c*. The finger hook portion 46*d* includes a through-hole penetrating through the lock member 46 in the right-left direction and a protruding portion 46*e* formed in the front end portion on the edge of the through-hole. The protruding portion 46*e* protrudes toward the left side. The protruding portion 46*e* is formed like a flat plate having its thickness direction in the front-back direction. The front end portion of the lock member 46 is provided with a protrusion that is inserted into a rear end portion of the compression coil spring 49.

The front end portion of the first cover main body 51 is provided with a tube portion 51*a* that has a cylindrical shape and protrudes toward the right side. The rear end portion of the first cover main body 51 is provided with a tube portion 51*b* that has a cylindrical shape and protrudes toward the right side. On the inner periphery side of the tube portions 51*a* and 51*b*, flat-plate like partition walls 51*c* are formed to divide the tube portions 51*a* and 51*b* at an intermediate position in the right-left direction. On the left side of the partition wall 51*c*, a cylindrical inner tube portion 51*d* is formed, which protrudes from the partition wall 51*c* toward the left side. The outer diameter of the inner tube portion 51*d* is smaller than the inner diameters of the tube portions 51*a* and 51*b*. The inner tube portions 51*d* are located on the inner periphery side of the tube portions 51*a* and 51*b*. The axis centers of the inner tube portions 51*d* correspond to the axis centers of the tube portions 51*a* and 51*b*. The partition wall 51*c* is provided with a through-hole that leads to the inner periphery surface of the inner tube portion 51*d*.

The first cover main body 51 is provided with openings 51*e* to expose the finger hook portions 45*d* and 46*d* on the left surface of the cover 33. The opening 51*e* is a through-hole penetrating through the first cover main body 51 in the right-left direction. The openings 51*e* are formed at two positions, the rear side of the tube portion 51*a* and the front side of the tube portion 51*b*. Further, the first cover main body 51 is provided with the recessed portion 51*f* to which the wireless tag 31 is attached. That is, the cover 33 is provided with the recessed portion 51*f* to which the wireless tag 31 is attached.

The recessed portion 51*f* is formed on the left surface of the first cover main body 51. The recessed portion 51*f* is formed in a center portion of the first cover main body 51 in the front-back direction and is located between the two openings 51*e* in the front-back direction. The recessed portion 51*f* is rectangularly recessed toward the right side. Furthermore, the recessed portion 51*f* is formed from a lower end portion of the first cover main body 51 to an upper end of the first cover main body 51. Protrusions 51*g* are formed on the edge of the recessed portion 51*f* to prevent the wireless tag 31 from being removed from the recessed portion 51*f* to the left side. The protrusion 51*g* protrudes toward the inner side of the recessed portion 51*f*.

In the front end portion of the second cover main body 52, a through-hole 52*a* is formed through the second cover main body 52 in the right-left direction. In the rear end portion of the second cover main body 52, a through-hole 52*b* is formed through the second cover main body 52 in the right-left direction. Furthermore, the second cover main body 52 is provided with two through-holes 52*c* through which the engagement protrusions 45*b* of the lock member 45 are inserted and two through-holes 52*d* through which the engagement protrusions 46*b* of the lock member 46 are inserted. The through-holes 52*c* and 52*d* penetrate through the second cover main body 52 in the right-left direction.

As described above, the lock members 45 and 46 are sandwiched between the first cover main body 51 and the second cover main body 52 in the right-left direction. In a state where the cover 33 is assembled, the tube portion 51*a* of the first cover main body 51 is located on the inner periphery side of the through-hole 45*c* of the lock member 45 and the inner periphery side of the through-hole 52*a* of the second cover main body 52, and the tube portion 51*b* of the first cover main body 51 is located on the inner periphery side of the through-hole 46*c* of the lock member 46 and the inner periphery side of the through-hole 52*b* of the second cover main body 52. The second cover main body 52 is fixed to the first cover main body 51 primarily with screws 54.

The compression coil spring 48 is located behind the lock member 45. A protrusion formed on the right surface side of the center portion of the first cover main body 51 in the front-back direction is inserted into the rear end portion of the compression coil spring 48. The compression coil spring 49 is located in front of the lock member 46. A protrusion formed on the right surface side of the center portion of the first cover main body 51 in the front-back direction is inserted into the front end portion of the compression coil spring 49.

The couplings 36 and 41 include tube portions 36*a* and 41*a* that are formed to have a cylindrical shape. The couplings 36 and 41 are arranged such that the axial directions of the tube portions 36*a* and 41*a* correspond to the right-left direction. Furthermore, the couplings 36 and 41 include circular portions 36*b* and 41*b* that have a circular and flat-plate like shape and connect to the right ends of the tube portions 36*a* and 41*a*, inner tube portions 36*c* and 41*c* that have a bottomed cylindrical shape and protrude toward the left side from the inner periphery side of the circular portions 36*b* and 41*b*, and rod-like knob engagement portions 36*d* and 41*d* that are located at the left end of the inner tube portions 36*c* and 41*c* and protrude toward the left side from the center of the bottom portions of the inner tube portions 36*c* and 41*c*.

The axial centers of the tube portions 36*a* and 41*a*, the axial centers of the inner tube portions 36*c* and 41*c*, and the axial centers of the knob engagement portions 36*d* and 41*d* correspond to each other. The right surface of the circular portion 36*b* is provided with a plurality of projecting portions 36*e* that engages with a gear 4*a* formed on the left end side of the supply-side bobbin 4. The right surface of the circular portion 41*b* is provided with a plurality of projecting portions 41*e* that engages with a gear 5*a* formed on the left end side of the wind-up side bobbin 5. The sleeves 35 and 40 are formed to have a disk shape. The sleeves 35 and 40 are arranged such that the thickness direction of the sleeves 35 and 40 corresponds to the right-left direction. The sleeves 35 and 40 are provided with through-holes through which the knob engagement portions 36*d* and 41*d* are inserted.

The sleeve 35 is located on the inner periphery side of the tube portion 51*a* of the first cover main body 51. The sleeve 35 is located on the right side of the partition wall 51*c*. Most portion of the coupling 36 except for the right end portion is located on the inner periphery side of the tube portion 51*a*.

The circular portion 36*b* is located on the right side of the tube portion 51*a*. The compression coil spring 37 is located between the sleeve 35 and the circular portion 36*b* in the right-left direction. Furthermore, the compression coil spring 37 is located on the inner periphery side of the tube portion 36*a* and on the outer periphery side of the inner tube portion 36*c*. The left end of the compression coil spring 37 is in contact with the right surface of the sleeve 35, and the right end of the compression coil spring 37 is in contact with the left surface of the circular portion 36*b*.

A washer 56 is provided between the sleeve 35 and the partition wall 51*c*. The knob engagement portion 36*d* is inserted into the inner tube portion 51*d* located on the inner periphery side of the tube portion 51*a*. The left end of the knob engagement portion 36*d* is located on the left side of the left end of the inner tube portion 51*d*. The knob 34 is attached to the left end of the knob engagement portion 36*d*. The knob 34 is rotatable along the outer periphery surface of the inner tube portion 51*d* around the rotation axis direction in the right-left direction. When the operator turns the knob 34, the supply-side bobbin 4 rotates.

Similarly, the sleeve 40 is located on the inner periphery side of the tube portion 51*b* of the first cover main body 51. The sleeve 40 is located on the right side of the partition wall 51*c*. Most portion of the coupling 41 except for the right end portion is located on the inner periphery side of the tube portion 51*b*. The circular portion 41*b* is located on the right side of the tube portion 51*b*. The compression coil spring 42 is located between the sleeve 40 and the circular portion 41*b* in the right-left direction. Further, the compression coil spring 42 is located on the inner periphery side of the tube portion 41*a* and on the outer periphery side of the inner tube portion 41*c*. The left end of the compression coil spring 42 is in contact with the right surface of the sleeve 40, and the right end of the compression coil spring 42 is in contact with the left surface of the circular portion 41*b*.

The washer 56 is placed between the sleeve 40 and the partition wall 51*c*. The knob engagement portion 41*d* is inserted into the inner tube portion 51*d* located on the inner periphery side of the tube portion 51*b*. The left end of the knob engagement portion 41*d* is located on the left side of the left end of the inner tube portion 51*d*. The knob 39 is attached to the left end of the knob engagement portion 41*d*. The knob 39 is rotatable along the outer periphery surface of the inner tube portion 51*d* around the rotation axis direction in the right-left direction. When the operator turns the knob 39, the wind-up side bobbin 5 rotates.

The lock members 45 and 46 are movable with respect to the cover main body 47 between a lock position where the engagement protrusions 45*a* and 46*a* engage with the engagement holes 32*d*, the engagement protrusions 45*b* engage with the engagement protrusions 32*g*, and the engagement protrusions 46*b* engage with the engagement protrusions 32*h* so that the cover 33 is fixed to the case main body 32 and an unlock position where the engagement state between the engagement protrusions 45*a* and 46*a* and the engagement holes 32*d* is canceled, the engagement state between the engagement protrusions 45*b* and the engagement protrusions 32*g* is canceled, and the engagement state between the engagement protrusions 46*b* and the engagement protrusions 32*h* is canceled so that the cover 33 is removable from the case main body 32. That is, the lock members 45 and 46 are slidable in the right-left direction with respect to the cover main body 47 between the lock position and the unlock position. Guides are formed between the cover main body 47 and the lock members 45 and 46 to guide the lock members 45 and 46 in the right-left direction.

The compression coil springs 48 and 49 bias the lock members 45 and 46 toward the lock position. To move the lock members 45 and 46 to the unlock position, the operator puts his/her fingers on the finger hook portions 45*d* and 46*d* and slides the lock members 45 and 46 inward in the front-back direction. Specifically, the operator holds the two finger hook portions 45*d* and 46*d* and slides the lock members 45 and 46 inward in the front-back direction. As described above, the lock members 45 and 46 are provided with the finger hook portions 45*d* and 46*d* to move the lock members 45 and 46 inward in the front-back direction. According to the present embodiment, to replace the used ink ribbon 3, the lock members 45 and 46 are moved to the unlock position, the cover 33 is removed from the case main body 32, and only the ink ribbon unit 29 is replaced.

The wireless tag 31 stores information about the ink ribbon 3. Specifically, the wireless tag 31 stores the identification information on the ink ribbon 3, and the like, including information such as the type of the ink ribbon 3. The wireless tag 31 is formed to have a shape like a seal. The wireless tag 31 formed like a seal is attached to a flat-plate like reinforcement plate 58. The reinforcement plate 58 is made of, for example, a resin material. The reinforcement plate 58 is formed to be rectangular.

The wireless tag 31 attached to the reinforcement plate 58 is inserted into and attached to the recessed portion 51*f* of the first cover main body 51 from above. The wireless tag 31 and the ink ribbon unit 29 make up a set, and when the ink ribbon unit 29 is replaced in order to replace the used ink ribbon 3, the wireless tag 31 attached to the recessed portion 51*f* is also replaced with the wireless tag 31 making up a set with the ink ribbon unit 29 after replacement.

According to the present embodiment, when the cartridge 6 is attached to the main body portion 7, the wireless communication part 11 reads the information about the ink ribbon 3 stored in the wireless tag 31. The controller 12 causes the printing apparatus 1 to perform a printing process when the information about the ink ribbon 3 read by the wireless communication part 11 is predetermined information. Specifically, the controller 12 operates the card conveyance mechanism 8, the thermal head 9, the ribbon feed mechanism 10, and the head moving mechanism 24 to cause the printing apparatus 1 to perform a printing process only when the information about the ink ribbon 3 read by the wireless communication part 11 is information about the appropriate ink ribbon 3 that conforms to the specifications, or the like, of the printing apparatus 1. According to the present embodiment, when the wireless tag 31 is not attached to the first cover main body 51 and the wireless communication part 11 is unable to read the information about the ink ribbon 3, the controller 12 does not allow the printing apparatus 1 to perform a printing process.

Primary Effect of Present Embodiment

As described above, according to the present embodiment, the case 30 housing the ink ribbon 3 wound around the supply-side bobbin 4 and the ink ribbon 3 wound around the wind-up side bobbin 5 includes the case main body 32 including the cylindrical supply-side case portion 32*a* to house the ink ribbon 3 wound around the supply-side bobbin 4 and the cylindrical wind-up side case portion 32*b* to house the ink ribbon 3 wound around the wind-up side bobbin 5 and includes the cover 33 to close the left ends of the supply-side case portion 32*a* and the wind-up side case portion 32*b*, and the cover 33 is removably attached to the case main body 32.

Therefore, according to the present embodiment, as described above, to replace the used ink ribbon 3, the cover 33 may be removed from the case main body 32 and only the ink ribbon unit 29 may be replaced. That is, according to the present embodiment, when the used ink ribbon 3 is replaced, only the ink ribbon unit 29 may be replaced and the case 30 may be reused. Thus, according to the present embodiment, it is possible to reduce the running cost of the printing apparatus 1 using the ink ribbon 3.

According to the present embodiment, the lock members 45 and 46 are movable with respect to the cover main body 47 between the lock position where the cover 33 is fixed to the case main body 32 and the unlock position where the cover 33 is removable from the case main body 32, and the compression coil springs 48 and 49 bias the lock members 45 and 46 toward the lock position. Therefore, according to the present embodiment, the operator may move the lock members 45 and 46 to the unlock position against the bias force of the compression coil springs 48 and 49 so as to remove the cover 33 from the case main body 32. Thus, according to the present embodiment, the cover 33 may be easily removed from the case main body 32 even at the site where the printing apparatus 1 is installed, and as a result, only the ink ribbon unit 29 may be easily replaced.

Furthermore, according to the present embodiment, the first cover main body 51 is provided with the openings 51*e* to expose the finger hook portions 45*d* and 46*d* of the lock members 45 and 46 on the left surface of the cover 33, and the finger hook portions 45*d* and 46*d* are exposed on the left surface of the cover 33. Therefore, according to the present embodiment, the use of the finger hook portions 45*d* and 46*d* makes it possible to easily slide the lock members and 46 to the unlock position.

According to the present embodiment, the wireless tag 31 storing the information about the ink ribbon 3 is attached to the case 30. Furthermore, according to the present embodiment, the printing apparatus 1 includes the wireless communication part 11 to perform short-range wireless communications with the wireless tag 31. Therefore, according to the present embodiment, the controller 12 of the printing apparatus 1 may determine whether the ink ribbon cassette 26 has the appropriate ink ribbon 3 that conforms to the specifications, or the like, of the printing apparatus 1 based on the information stored in the wireless tag 31. Further, based on the information about the ink ribbon 3 read by the wireless communication part 11, the controller 12 may cause the printing apparatus 1 to perform the printing process only when it is determined that the ink ribbon cassette 26 has the appropriate ink ribbon 3 that confirms to the specifications, or the like, of the printing apparatus 1.

According to the present embodiment, the first cover main body 51 is provided with the recessed portion 51*f* to which the wireless tag 31 is attached, and the wireless tag 31 attached to the reinforcement plate 58 is inserted into and attached to the recessed portion 51*f* from above. Therefore, according to the present embodiment, the wireless tag 31 may be easily attached to and removed from the case 30. Thus, according to the present embodiment, the wireless tag 31 may be easily replaced even when the wireless tag 31 attached to the recessed portion 51*f* is replaced each time the used ink ribbon 3 is replaced, as described above.

Other Embodiments

Although the above-described embodiment is an example of the embodiments of the present invention, it is not limited thereto, and various modifications may be implemented without changing the gist of at least an embodiment of the present invention.

Figure 8:
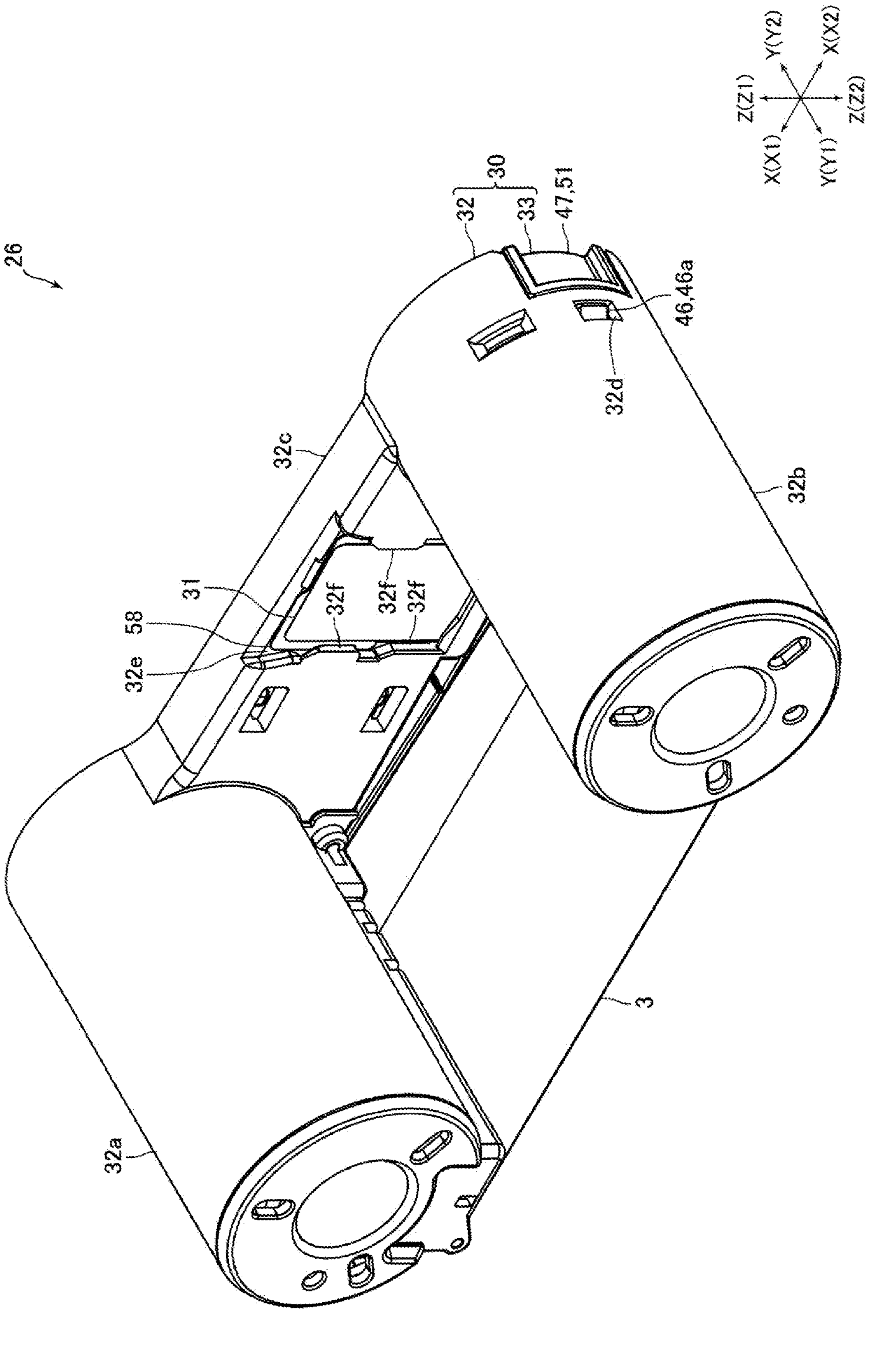
FIG. 8 is a perspective view of an ink ribbon cassette according to another embodiment of the present invention.

According to the embodiment described above, the wireless tag 31 may be attached to the recessed portion 32*e* of the case main body 32, as illustrated in FIG. 8. In a case where the wireless tag 31 is attached to the recessed portion 32*e*, the wireless tag 31 is not visible from the outside of the cartridge 6 when the ink ribbon cassette 26 is attached to the cartridge main body portion 27. Conversely, in a case where the wireless tag 31 is attached to the recessed portion 51*f*, the wireless tag 31 is visible from the outside of the cartridge 6 when the ink ribbon cassette 26 is attached to the cartridge main body portion 27. Furthermore, according to the embodiment described above, the recessed portion 32*e* does not need to be formed in the case main body 32. Further, when the wireless tag 31 is attached to the recessed portion 32*e*, the recessed portion 51*f* does not need to be formed in the first cover main body 51.

According to the embodiment described above, the wireless tag 31 may be formed like a flat plate. In this case, the reinforcement plate 58 is not needed. Furthermore, in this case, the flat-plate like wireless tag 31 is inserted into and attached to the recessed portion 51*f* from above. Further, according to the embodiment described above, the seal-like wireless tag 31 may be attached directly to the case 30. In this case, the recessed portions 32*e* and 51*f* do not need to be formed in the case 30. Furthermore, according to the embodiment described above, the ink ribbon cassette 26 does not need to include the wireless tag 31. In this case, the printing apparatus 1 does not include the wireless communication part 11. Furthermore, in this case, the recessed portions 32*e* and 51*f* do not need to be formed in the case 30.

According to the embodiment described above, the case main body 32 may be provided with, instead of the engagement holes 32*d*, engagement protrusions serving as case-side engagement portions corresponding to the engagement protrusions 45*a* and 46*a*, and the lock members 45 and 46 may be provided with, instead of the engagement protrusions 45*a* and 46*a*, engagement holes serving as cover-side engagement portions corresponding to the engagement holes 32*d*. Furthermore, according to the embodiment described above, the case main body 32 may be provided with, instead of the engagement protrusions 32*g* and 32*h*, engagement holes serving as case-side engagement portions that engage with the engagement protrusions 45*b* and 46*b*, and the lock members 45 and 46 may be provided with, instead of the engagement protrusions 45*b* and 46*b*, engagement holes serving as cover-side engagement portions that engage with the engagement protrusions 32*g* and 32*h*.

According to the embodiment described above, the engagement protrusions 32*g* and 32*h* do not need to be formed in the case main body 32. In this case, the engagement protrusions 45*b* and 46*b* are not formed in the lock members 45 and 46. Furthermore, according to the embodiment described above, the engagement hole 32*d* does not need to be formed in the case main body 32. In this case, the engagement protrusions 45*a* and 46*a* are not formed in the lock members 45 and 46.

According to the embodiment described above, the bias members that bias the lock members 45 and 46 to the cover main body 47 may be spring members other than the compression coil springs 48 and 49. Furthermore, according to the embodiment described above, the ink ribbon cassette 26 attached to the cartridge main body portion 27 is attachable to and removable from the main body portion 7, but the main body portion 7 may be configured such that the ink ribbon cassette 26 is directly attachable to and removable from the main body portion 7. Furthermore, in the embodiment described above, the print medium printed by the printing apparatus 1 may be other than the card 2, such as print paper.

Configuration of Present Technology

The present technology may be configured as follows.

(1) An ink ribbon cassette includes: an ink ribbon unit including an ink ribbon, a supply-side bobbin around which the ink ribbon before ink transfer is wound, and a wind-up side bobbin around which the ink ribbon after ink transfer is wound; and a case to house the ink ribbon wound around the supply-side bobbin and the ink ribbon wound around the wind-up side bobbin, the case includes: a case main body including a cylindrical supply-side case portion to house the ink ribbon wound around the supply-side bobbin and a cylindrical wind-up side case portion to house the ink ribbon wound around the wind-up side bobbin; and a cover removably attached to the case main body to close one end of the cylindrically formed supply-side case portion and one end of the cylindrically formed wind-up side case portion, the case main body is provided with a case-side engagement portion to fix the cover to the case main body, the cover includes: a lock member provided with a cover-side engagement portion to engage with the case-side engagement portion; a cover main body to movably hold the lock member; and a bias member to bias the lock member to the cover main body, the lock member is movable with respect to the cover main body between a lock position where the case-side engagement portion engages with the cover-side engagement portion so that the cover is fixed to the case main body and an unlock position where an engagement state between the case-side engagement portion and the cover-side engagement portion is canceled so that the cover is removable from the case main body, and the bias member biases the lock member toward the lock position.

(2) In the ink ribbon cassette according to (1), an axial direction of the cylindrically formed supply-side case portion is parallel to an axial direction of the cylindrically formed wind-up side case portion, when a predetermined direction perpendicular to the axial direction of the supply-side case portion is a front-back direction, the supply-side case portion and the wind-up side case portion are located with a space in the front-back direction, and the cover includes, as the lock member, a first lock member slidable with respect to the cover main body in the front-back direction and a second lock member that is located behind the first lock member and is slidable with respect to the cover main body in the front-back direction and includes, as the bias member, a first bias member to bias the first lock member toward a front side and a second bias member to bias the second lock member toward a back side.

(3) In the ink ribbon cassette according to (2), when the axial direction of the supply-side case portion is a right-left direction, the cover is attached to a left end portion of the case main body, the cover main body includes a first cover main body and a second cover main body to sandwich the lock member in the right-left direction, the first cover main body is located on a left side of the second cover main body, the lock member is provided with a finger hook portion to slide the lock member inward in the front-back direction, and the first cover main body is provided with an opening to expose the finger hook portion on a left surface of the cover.

(4) The ink ribbon cassette according to any one of (1) to (3) includes a wireless tag attached to the case to store information about the ink ribbon.

(5) In the ink ribbon cassette according to (4), the wireless tag is formed like a seal and is attached to a flat-plate like reinforcement plate or is formed like a flat plate.

(6) In the ink ribbon cassette according to (5), at least any one of the case main body and the cover is provided with a recessed portion to which the wireless tag is attached, when the wireless tag is formed like a seal and is attached to the reinforcement plate, the reinforcement plate having the wireless tag attached thereto is inserted into and attached to the recessed portion, and when the wireless tag is formed like a flat plate, the flat-plate like wireless tag is inserted into and attached to the recessed portion.

(7) A printing apparatus includes: the ink ribbon cassette according to any one of (1) to (3); and a main body portion to which the ink ribbon cassette is removably attached, and the main body portion includes: a medium conveyance path through which a print medium is conveyed; and a thermal head to heat the ink ribbon and transfer ink on the ink ribbon to the print medium passing through the medium conveyance path to execute printing.

(8) A printing apparatus includes: the ink ribbon cassette according to any one of (4) to (6); a main body portion to which the ink ribbon cassette is removably attached; a wireless communication part to perform short-range wireless communications with the wireless tag; and a controller to control the printing apparatus, and the main body portion includes: a medium conveyance path through which a print medium is conveyed; and a thermal head to heat the ink ribbon and transfer ink on the ink ribbon to the print medium passing through the medium conveyance path to execute printing, and when information about the ink ribbon read by the wireless communication part is predetermined information, the controller causes the printing apparatus to perform a printing process.

What is claimed is:

1. An ink ribbon cassette comprising:

an ink ribbon unit comprising an ink ribbon, a supply-side bobbin around which the ink ribbon before ink transfer is wound, and a wind-up side bobbin around which the ink ribbon after ink transfer is wound; and a case to house the ink ribbon wound around the supply-side bobbin and the ink ribbon wound around the wind-up side bobbin, wherein the case comprises:

a case main body comprising a cylindrical supply-side case portion to house the ink ribbon wound around the supply-side bobbin and a cylindrical wind-up side case portion to house the ink ribbon wound around the wind-up side bobbin; and a cover removably attached to the case main body to close one end of the cylindrically formed supply-side case portion and one end of the cylindrically formed wind-up side case portion, the case main body is provided with a case-side engagement portion to fix the cover to the case main body, the cover comprises:

a lock member provided with a cover-side engagement portion to engage with the case-side engagement portion;

a cover main body to movably hold the lock member; and a bias member to bias the lock member to the cover main body, the lock member is movable with respect to the cover main body between a lock position where the case-side engagement portion engages with the cover-side engagement portion so that the cover is fixed to the case main body and an unlock position where an engagement state between the case-side engagement portion and the cover-side engagement portion is canceled so that the cover is removable from the case main body, and the bias member biases the lock member toward the lock position.

2. The ink ribbon cassette according to claim 1, wherein an axial direction of the cylindrically formed supply-side case portion is parallel to an axial direction of the cylindrically formed wind-up side case portion, when a predetermined direction perpendicular to the axial direction of the supply-side case portion is a front-back direction, the supply-side case portion and the wind-up side case portion are located with a space in the front-back direction, and the cover comprises, as the lock member, a first lock member slidable with respect to the cover main body in the front-back direction and a second lock member that is located behind the first lock member and is slidable with respect to the cover main body in the front-back direction and comprises, as the bias member, a first bias member to bias the first lock member toward a front side and a second bias member to bias the second lock member toward a back side.

3. The ink ribbon cassette according to claim 2, wherein when the axial direction of the supply-side case portion is a right-left direction, the cover is attached to a left end portion of the case main body, the cover main body comprises a first cover main body and a second cover main body to sandwich the lock member in the right-left direction, the first cover main body is located on a left side of the second cover main body, the lock member is provided with a finger hook portion to slide the lock member inward in the front-back direction, and the first cover main body is provided with an opening to expose the finger hook portion on a left surface of the cover.

4. The ink ribbon cassette according to claim 1, further comprising a wireless tag attached to the case to store information about the ink ribbon.

5. The ink ribbon cassette according to claim 4, wherein the wireless tag is formed like a seal and is attached to a flat-plate like reinforcement plate or is formed like a flat plate.

6. The ink ribbon cassette according to claim 5, wherein at least any one of the case main body and the cover is provided with a recessed portion to which the wireless tag is attached, when the wireless tag is formed like a seal and is attached to the reinforcement plate, the reinforcement plate having the wireless tag attached thereto is inserted into and attached to the recessed portion, and when the wireless tag is formed like a flat plate, the flat-plate like wireless tag is inserted into and attached to the recessed portion.

7. A printing apparatus comprising:

the ink ribbon cassette according to claim 1; and a main body portion to which the ink ribbon cassette is removably attached, wherein the main body portion comprises:

a medium conveyance path through which a print medium is conveyed; and a thermal head to heat the ink ribbon and transfer ink on the ink ribbon to the print medium passing through the medium conveyance path to execute printing.

8. A printing apparatus comprising:

the ink ribbon cassette according to claim 4;

a main body portion to which the ink ribbon cassette is removably attached;

a wireless communication part to perform short-range wireless communications with the wireless tag; and a controller to control the printing apparatus, wherein the main body portion comprises:

a medium conveyance path through which a print medium is conveyed; and a thermal head to heat the ink ribbon and transfer ink on the ink ribbon to the print medium passing through the medium conveyance path to execute printing, and when information about the ink ribbon read by the wireless communication part is predetermined information, the controller causes the printing apparatus to perform a printing process.

9. A printing apparatus comprising:

the ink ribbon cassette according to claim 2; and a main body portion to which the ink ribbon cassette is removably attached, wherein the main body portion comprises:

a medium conveyance path through which a print medium is conveyed; and a thermal head to heat the ink ribbon and transfer ink on the ink ribbon to the print medium passing through the medium conveyance path to execute printing.

10. A printing apparatus comprising:

the ink ribbon cassette according to claim 3; and a main body portion to which the ink ribbon cassette is removably attached, wherein the main body portion comprises:

a medium conveyance path through which a print medium is conveyed; and a thermal head to heat the ink ribbon and transfer ink on the ink ribbon to the print medium passing through the medium conveyance path to execute printing.

11. A printing apparatus comprising:

the ink ribbon cassette according to claim 5;

a main body portion to which the ink ribbon cassette is removably attached;

a wireless communication part to perform short-range wireless communications with the wireless tag; and a controller to control the printing apparatus, wherein the main body portion comprises:

a medium conveyance path through which a print medium is conveyed; and a thermal head to heat the ink ribbon and transfer ink on the ink ribbon to the print medium passing through the medium conveyance path to execute printing, and when information about the ink ribbon read by the wireless communication part is predetermined information, the controller causes the printing apparatus to perform a printing process.

12. A printing apparatus comprising:

the ink ribbon cassette according to claim 6;

a main body portion to which the ink ribbon cassette is removably attached;

a wireless communication part to perform short-range wireless communications with the wireless tag; and a controller to control the printing apparatus, wherein the main body portion comprises:

a medium conveyance path through which a print medium is conveyed; and a thermal head to heat the ink ribbon and transfer ink on the ink ribbon to the print medium passing through the medium conveyance path to execute printing, and when information about the ink ribbon read by the wireless communication part is predetermined information, the controller causes the printing apparatus to perform a printing process.

* * * * *